OCTAVE EUGENE FILLION, OF PARIS, FRANCE.

Letters Patent No. 102,798, dated May 10, 1870.

IMPROVEMENT IN THE MANUFACTURE OF ARTIFICIAL FLOWERS.

The Schedule referred to in these Letters Patent and making part of the same

*To all whom it may concern:*

Be it known that I, OCTAVE EUGENE FILLION, of Paris, in the French Empire, have invented new and useful Improvements in the Manufacture of Artificial Flowers and Foliages; and I do hereby declare that the following is a full, clear, and exact description thereof, which will enable others skilled in the art to make and use the same.

The various materials hitherto employed in the manufacture of artificial flowers have produced only imperfect imitations, as, whatever may be the fineness of the fabric used for the purpose, it is impossible to prevent the threads from becoming apparent.

Attempts have been made to obviate this objection by employing other materials, such as vegetable or animal matter, in thin sheets, or a compound on a paper base. Pulp, India rubber, and gutta-percha have also been used for the purpose; but none of these have produced a satisfactory result, the chief obstacles being their non-adaptability for being colored, their excessive hardness or softness, stiff appearance, or brittleness.

The most successful of known means consists in the application to artificial foliage of collodion, suitably colored, and ground in oil. Collodion alone is, however, incapable of reproducing the leaves of a flower, and this for the following reasons:

First, from its perfectly-translucid nature, which gives it, when colored, the appearance of colored glass.

Secondly, its want of stiffness when in thin sheets, rendering the fashioning of the leaf very difficult.

Thirdly, its luster, which is not possessed by flowers generally, but of which it cannot be deprived without adding some resinous matter thereto that would impair its strength, while powders would affect the tints.

My invention consists in making artificial flowers from a composition consisting of about one hundred parts, by weight, of collodion, twelve parts of castor-oil, and one or two parts of glycerine.

When I desire to produce a very fine white, I use a composition consisting of one hundred parts of collodion, ten parts of Venetian turpentine, four parts of castor-oil, and two parts of glycerine. The proportions may, however, be varied, if desired.

If greater stiffness is desired, I increase the proportion of resin; but if flexibility is required, I use less resin, and more oil.

As collodion alone is, as before mentioned, too transparent for use, I employ paper in connection therewith, and more particularly rice-paper and vegetable parchment, the latter being applicable for large-sized flowers; but Chinese or rice-paper gives the best results.

I avoid the use of woven tissues, because in them the threads are always perceptible, even in the finest fabrics, and, in order to conceal the threads, it is necessary to use collodion tinted by the aid of insoluble matters, which, while filling up the interstices or pores of the fabric, also impair the appearance of the flower.

I first cut the paper of the desired form, and color it in any suitable manner. When the leaves are dry, they are secured in suitable holders, and dipped in a bath of collodion composition, as above specified, from which they are immediately withdrawn. Should an excess of the mixture adhere to the lower ends of the leaves, it must be shaken off. I then suspend the holders from cords or rails, for the purpose of drying the leaves, this operation requiring from ten to twenty minutes, according to the state of the atmosphere.

This primary immersion completely changes the nature of the leaf, and, more especially its color, and, by repeating the immersion with similar care as at first, the flower will be caused to present an exact imitation of nature, being both semi-transparent, satin-faced to the eye and touch, flexible, and, more especially, presenting a freshness of appearance and fidelity of tint hitherto unattainable. In this condition, the material is ready to be taken in hand by the flower-maker, and made up in the usual manner.

The ordinary paste used by florists will generally serve for making up the articles, but in certain cases it is necessary to use a thick collodion paste, in order to render the joints invisible.

Foliage is also produced by the same process, only with the exception, that whole sheets of paper are thus treated before cutting out and coloring the same.

If it is desired to imitate leaves having a rough surface, like that of a geranium, for example, rice-paper will be found to answer the purpose. In this case, I first tint the leaf after it has been shaped; then apply a layer of collodion composition, repeating this application a suitable number of times on the under side of the leaf by means of a brush, for the purpose of rendering the surface smooth. Two immersions will generally suffice for the different kinds of green material.

I may also take a natural leaf, and dip it in collodion mixture used for the white flowers, to which I add a small quantity of arsenite of potash—two per cent., for example. I then allow it to dry, and repeat the operation until it becomes sufficiently firm, the veins of the leaf being, however, always perceptible. The collodion to be applied on the stalk should also contain color ground in oil, in order that it may not present a dead or flat surface, as would otherwise be the case.

I proceed in a similar manner with natural flowers and insects, although, in drying the collodionized natural flower, it is liable to turn white, and the color can be but imperfectly restored by the aid of a brush.

The colors I employ, by preference, are those derived from aniline, on account of their affinity to collodion.

Where the color is liable to be affected by the collodion, I apply it dry with a brush, the collodion being also used in a thickened condition by being prepared several days previously.

Having thus described my invention,

I claim as new and desire to secure by Letters Patent—

1. The herein-described process of making artificial flowers, foliage, &c., by immersing them, after they are colored, in collodion, as set forth.

2. The herein-described composition for treating artificial flowers and foliage.

O. FILLION.

Witnesses:
 A. GUION,
 DEMOS.